United States Patent [19]

Chau

[11] Patent Number: 5,596,369
[45] Date of Patent: Jan. 21, 1997

[54] STATISTICALLY DERIVED METHOD AND SYSTEM FOR DECODING MPEG MOTION COMPENSATION AND TRANSFORM CODED VIDEO DATA

[75] Inventor: Kwok K. Chau, Los Altos, Calif.

[73] Assignee: LSI Logic Corporation, Milpitas, Calif.

[21] Appl. No.: 377,160

[22] Filed: Jan. 24, 1995

[51] Int. Cl.$^6$ .................................. H04N 7/50
[52] U.S. Cl. .......................... 348/402; 348/423
[58] Field of Search .................... 348/402, 413, 348/416, 423; H04N 7/50

[56] References Cited

U.S. PATENT DOCUMENTS

| | | | |
|---|---|---|---|
| 4,660,079 | 4/1987 | Devimeux et al. | 358/141 |
| 5,202,761 | 4/1993 | Cooper | 358/149 |
| 5,351,090 | 9/1994 | Nakamura | 348/484 |
| 5,351,092 | 9/1994 | Poimboeuf et al. | 348/512 |
| 5,394,189 | 2/1995 | Motomura | 348/402 |
| 5,502,494 | 3/1996 | Auld | 348/402 |
| 5,510,857 | 4/1996 | Kopet | 348/699 |

*Primary Examiner*—Howard W. Britton
*Attorney, Agent, or Firm*—Poms, Smith, Lande & Rose

[57] ABSTRACT

A Motion Picture Experts Group (MPEG) video/audio data bitstream includes macroblocks of video data which can each include input Motion Compensation (M) data and input discrete cosine Transform Coded (I) data. A motion pipeline processes the input M data to produce processed M data, and a transform pipeline processes the input I data to produce processed I data. A controller controls the motion pipeline and the transform pipeline to concurrently process the input M data and the input I data respectively such that a length of time required for processing each macroblock is variable and is determined by the largest of a length of time required for the motion pipeline to process the input M data and a length of time required for the transform pipeline to process the input I data of the macroblock. The time required to process all of the macroblocks in a video picture is statistically less than if a fixed length of time were provided for processing each macroblock based on a worst case scenario, thereby reducing the memory bandwidth requirement of the system.

18 Claims, 7 Drawing Sheets

| FUNCTION | TRADITIONAL (64-BIT WORD/mb) | STATISTICAL (64-BIT WORD/mb) |
|---|---|---|
| CHANNEL INPUT | 6 | 6 |
| CHANNEL OUTPUT | 168 | 22 |
| MOTION COMPENSATION | 168 | 168 |
| STORE | 48 | 48 |
| DISPLAY | 78 | 78 |
| TOTAL | 468 | 322 |

STATISTICALLY DERIVED METHOD AND SYSTEM FOR DECODING MPEG MOTION COMPENSATION AND TRANSFORM CODED VIDEO DATA

BACKGROUND OF THE INVENTION

1. Field of the Invention

The present invention generally relates to the art of audio/video data compression and transmission, and more specifically to a statistically derived method and system for decoding Motion Picture Experts Group (MPEG) motion compensation and transform coded video data.

2. Description of the Related Art

Constant efforts are being made to make more effective use of the limited number of transmission channels currently available for delivering video and audio information and programming to an end user such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels provides cost reduction and increased broadcast capacity.

The number of separate channels that can be broadcast within the currently available transmission bandwidth can be increased by employing a process for compressing and decompressing video signals. Video and audio program signals are converted to a digital format, compressed, encoded and multiplexed in accordance with an established compression algorithm or methodology.

The compressed digital system signal, or bitstream, which includes a video portion, an audio portion, and other informational portions, is then transmitted to a receiver. Transmission may be over existing television channels, cable television channels, satellite communication channels, and the like.

A decoder is provided at the receiver to de-multiplex, decompress and decode the received system signal in accordance with the compression algorithm. The decoded video and audio information is then output to a display device such as a television monitor for presentation to the user.

Video and audio compression and encoding is performed by suitable encoders which implement a selected data compression algorithm that conforms to a recognized standard or specification agreed to among the senders and receivers of digital video signals. Highly efficient compression standards have been developed by the Moving Pictures Experts Group, including MPEG 1 and MPEG 2. The MPEG standards enable several VCR-like viewing options such as Normal Forward, Play, Slow Forward, Fast Forward, Fast Reverse, and Freeze.

Figure 1A:
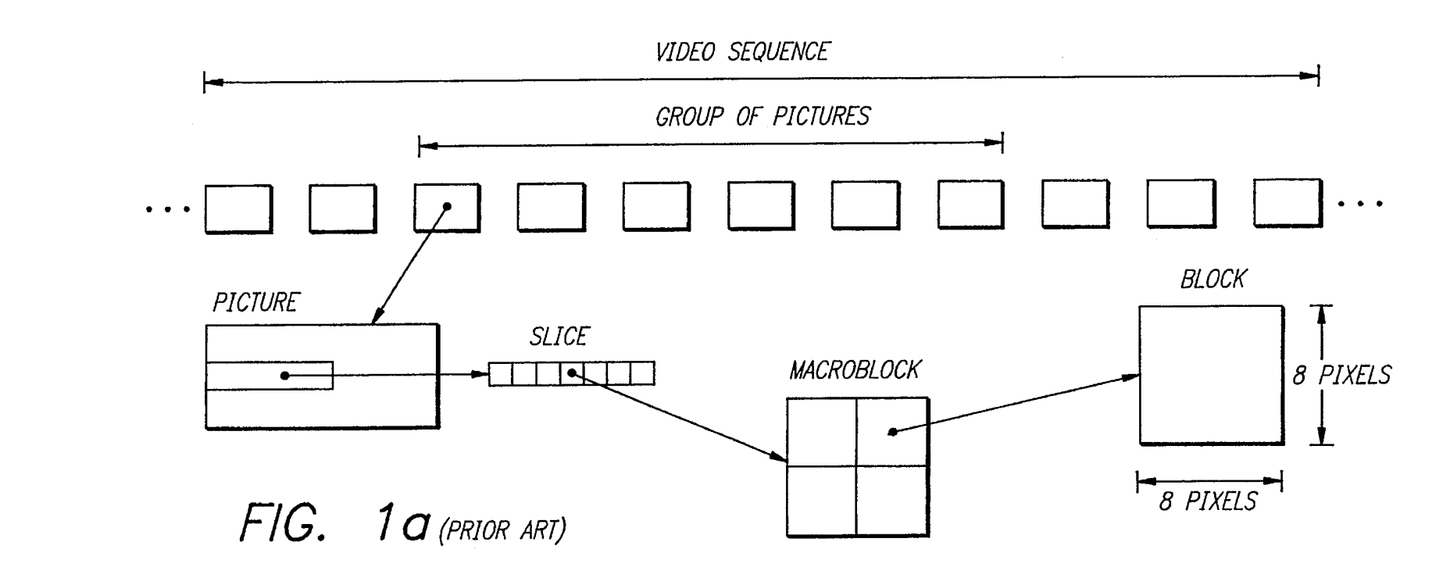
FIG. 1a is a diagram illustrating the constituent components of an MPEG video sequence.

The MPEG specification defines a hierarchial data structure in the video portion of the bitstream as illustrated in FIG. 1a.

A video sequence includes a sequence header, one or more groups of pictures, and an end-of-sequence code.

A group of pictures is a series of one or more pictures intended to allow random access into the sequence.

A picture is the primary coding unit of a video sequence. A picture consists of three rectangular matrices representing luminance (Y) and two chrominance (Cb,Cr) values. The Y matrix has an even number of rows and columns. The Cb and Cr matrices are one-half the size of the Y matrix in each direction (horizontal and vertical). Thus, for every four luminance values, there are two associated chrominance values (one Cb value and one Cr value).

A slice is one or more contiguous macroblocks. Slices are important in the handling of errors. If the bitstream contains an error, the decoder can skip to the start of the next slice.

Figure 1B:
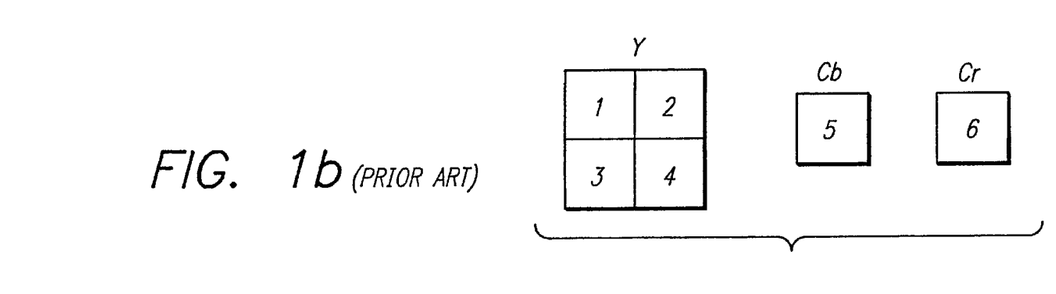

A macroblock is a 16 pixel ×16 line section of luminance components and the corresponding chrominance components. As illustrated in FIG. 1b, a macroblock includes four Y blocks, one Cb block and one Cr block. The numbers correspond to the ordering of the blocks in the data stream, with block 1 first.

A block is an 8×8 set of values of a luminance or chrominance component.

The MPEG standard defines three main types of video pictures.

1. Intracoded pictures (I-pictures) which are coded without reference to any other pictures.

2. Predictive-coded pictures (P-pictures) which are coded using motion-compensated forward prediction from a previous I or P reference picture.

3. Bidirectional predictive-coded pictures (B-pictures) which are coded using interpolated motion compensation from a previous and a future I or P picture.

I pictures are coded using only the Discrete Cosine Transform (DCT) which converts time and space domain into frequency and amplitude domain for the purpose of achieving data compression.

The macroblock is the basic motion compensation unit for P and B pictures. Each macroblock is coded by computing a motion compensation vector which defines the displacement between the macroblock, and the corresponding macroblock in the reference I or P picture(s) from which it is being predicted. If there is little or no motion, the motion compensation vector will not be transmitted.

A comparison macroblock is then generated by displacing the reference macroblock by the amount indicated by the motion compensation vector, which is then subtracted from the macroblock of the P or B picture that is being coded to produce an error signal which corresponds to the difference therebetween. The error signal is then coded using DCT (similar to an intracoded picture) and transmitted with the motion vector. If, however, the error signal is small or zero, no error component is transmitted.

Thus, a predictive coded macroblock (P or B) can consist of only a motion compensation component, only a transform (DCT) coded component, or both.

After motion compensation and DCT coding are performed, the macroblock is quantized, and Variable Length Coded (VLC) to further compress the data bitstream. The macroblocks are then assembled into slices, pictures, groups of pictures and video sequences, multiplexed with associated audio data, and transmitted to a user for decoding and presentation.

Figure 2:
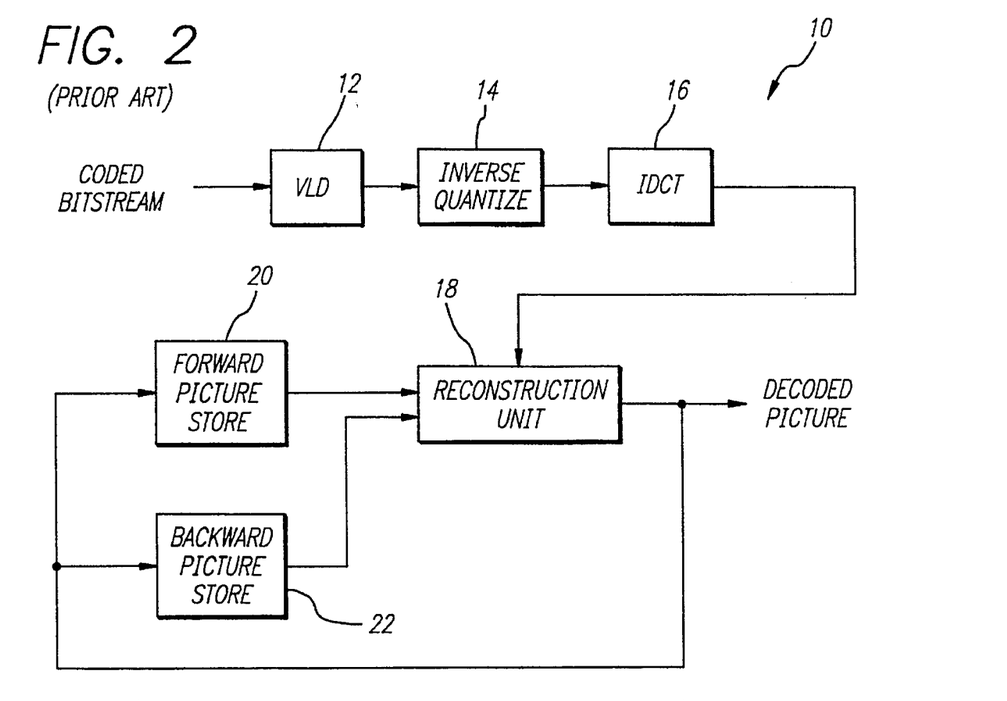
FIG. 2 is a block diagram illustrating the MPEG decoding process.

FIG. 2 illustrates a basic decoding system 10 for decoding an MPEG video data bitstream. The bitstream is de-multiplexed, Variable Length Decoded (VLD) by a VLD decoder 12, inverse quantized by an inverse quantizer 14, and any DCT coded blocks are subjected to Inverse Discrete Cosine Transformation (IDCT) decoding by an IDCT decoder 16. The pictures are then reconstructed by a reconstruction unit 18 and output as decoded pictures.

I and P pictures that are to be used as reference pictures for forward or backward prediction are output from the reconstruction unit 18 and stored in forward and backward picture stores (memories) 20 and 22 respectively.

I pictures that are not to be used for future prediction are output directly. The reconstruction unit 18 applies the motion compensation vector and error (DCT coded) data from a P picture to a reference picture stored in the forward picture store 20 to reconstruct the P picture. The reconstruction unit 18 uses both a forward picture and a backward picture from the stores 20 and 22 to interpolate a B picture based on its motion compensation and DCT coded information.

Figure 3:
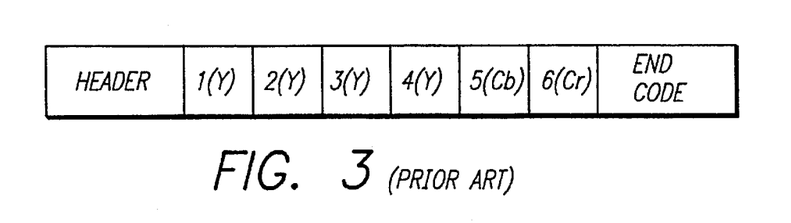
FIG. 3 is a diagram illustrating an MPEG video macroblock.
Figure 4:
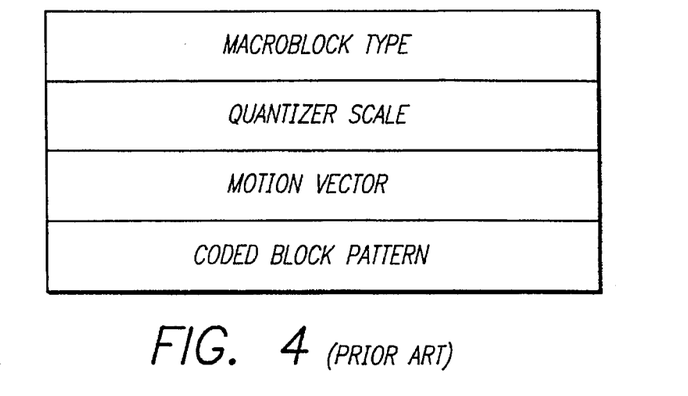
FIG. 4 is a simplified diagram illustrating the relevant components of a header of the macroblock of FIG. 3.

A coded macroblock is illustrated in simplified form in FIG. 3, and includes a header, four luminance blocks (Y), one chrominance block Cb and one chrominance block Cr. The components of the header which are relevant to the present invention are illustrated in FIG. 4, and include a type designation (I, P or B), a new quantizer scale if the quantization scale is to be changed, a motion compensation vector and a coded macroblock pattern.

Each block in a macroblock is DCT coded individually. If the error signal for a particular block is zero or very small, the block is not coded and is omitted from the bitstream. The coded block pattern indicates which blocks of the macroblock are included in DCT coded form in the bitstream. As discussed above, it is possible for a macroblock to include only a motion compensation vector and no DCT coded blocks.

Traditional or conventional reconstruction methods use two dedicated pipelines for parallel execution of the two major components; motion compensation (M) and DCT transform coded (I) data. Input and output data are temporarily stored in a memory, which is typically a Dynamic Random Access Memory (DRAM).

Although the amount of data and encoding type (there are a number of motion compensation and DCT encoding modes) can vary substantially for different macroblocks, the memory bandwidth allocation for the DRAM is fixed for all types of macroblocks. The memory bandwidth is the product of the memory word length (number of bits used for transferring data to and from the DRAM in parallel), and the memory access speed. The bandwidth allocation of the system per macroblock is determined by the worst case combination of M and I data.

In reality, however, the complex I and especially M modes are used in a low percentage of the macroblocks in a picture. It is virtually impossible to code a picture with the most complex mode in all macroblocks. Hence, a system with this fixed bandwidth allocation scheme has unnecessarily low bandwidth utilization and higher system bandwidth requirement for instantaneous bandwidth bursts.

SUMMARY OF THE INVENTION

In accordance with the present invention, a Motion Picture Experts Group (MPEG) video/audio data bitstream includes macroblocks of video data which can each include input Motion Compensation (M) data and input discrete cosine Transform Coded (I) data.

A motion pipeline decodes the input M data to produce processed M data, and a transform pipeline decodes the input I data to produce processed I data. A controller controls the motion pipeline and the transform pipeline to concurrently process the input M data and the input I data respectively such that a length of time required for processing each macroblock is variable and is determined by the largest of a length of time required for the motion pipeline to process the input M data and a length of time required for the transform pipeline to transform the input I data of the macroblock.

Each macroblock further includes a header, and the system includes a data memory for storing processed M data and transform coded data. The controller causes processed M data from the motion pipeline of each macroblock to be merged and stored in the data memory with processed I data from the transform pipeline of the macroblock concurrently with reading a header of a next macroblock.

The time required to process all of the macroblocks in a video picture is statistically less than if a fixed length of time were provided for processing each macroblock based on a worst case scenario as in the prior art, thereby reducing the memory bandwidth requirement of the system.

The statistically derived decoding method according to the present invention takes into account the behavior of the various macroblock coding types. It determines the bandwidth requirement at a higher picture level instead of at the macroblock level. Then, the bandwidth allocation is done in a demand driven fashion, such that a macroblock with less bandwidth requirement will be decoded faster than a complex macroblock with higher bandwidth requirement.

Furthermore, the reconstruction time for the small percentage of complex macroblocks is allowed to extend longer than average cases. This higher level bandwidth optimization results in significantly better bandwidth utilization and lower instantaneous peak bandwidth.

The present statistical decoding technique thereby provides a significant improvement in bandwidth utilization which translates into savings in system cost in terms of lower memory cost and reduced power consumption. It enables real-time high quality full-motion video processing in low cost applications such as consumer electronics.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1b is a diagram illustrating the constituent components of a macroblock of the video sequence of FIG. 1a;

DETAILED DESCRIPTION OF THE INVENTION

Figure 5:
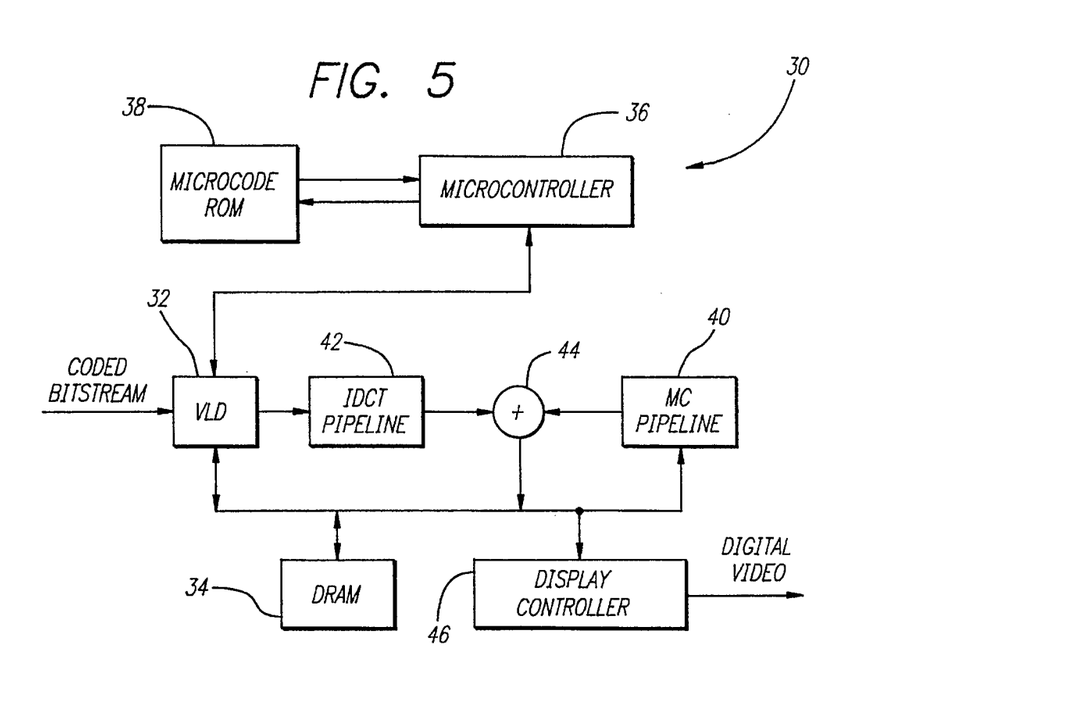
FIG. 5 is a diagram illustrating an MPEG video decoding system embodying the present invention.

A decoding system 30 for decoding an MPEG video data bitstream is illustrated in FIG. 5. The system 30 comprises a variable length decoder 32 for variable length decoding, inverse quantizing and pre-parsing an encoded input MPEG video bitstream. The video data from the bitstream is stored in a DRAM 34, which is used as a channel or rate buffer, as well as a frame buffer for storing forward and backward reference pictures for predictive reconstruction. The frame buffer portion of the DRAM 34 is also utilized in re-ordering I, P and B pictures from decoding order to presentation order.

The operation of the system 30 is controlled by a microcontroller 36 which executes an operating program stored in a microcode Read Only Memory (ROM) 38. Preferably, all of the elements with the exception of the DRAM 34 are formed on a single integrated circuit chip.

Under control of the microcontroller 36, each picture is decoded or processed one macroblock at a time for reconstruction and presentation. The motion compensation information (M) is processed by a motion compensation (MC) pipeline 40 which reads input M data in segments from the DRAM 34, decodes or processes the segments, and stores them back in the DRAM 34 as processed M data. An IDCT transform pipeline 42 reads segments of input DCT transform coded (I) data from the DRAM 34, decodes or processes the segments, and stores them back in the DRAM 34 as processed I data.

The pipelines 40 and 42 operate on the M and I data concurrently in parallel. The processed M and I data is merged together for storage in the DRAM 34 by a merge unit 44, and the processed M and I data is then read out of the DRAM 34 by a display controller 46 which performs picture re-ordering and output of decoded video data for presentation.

Figure 6:
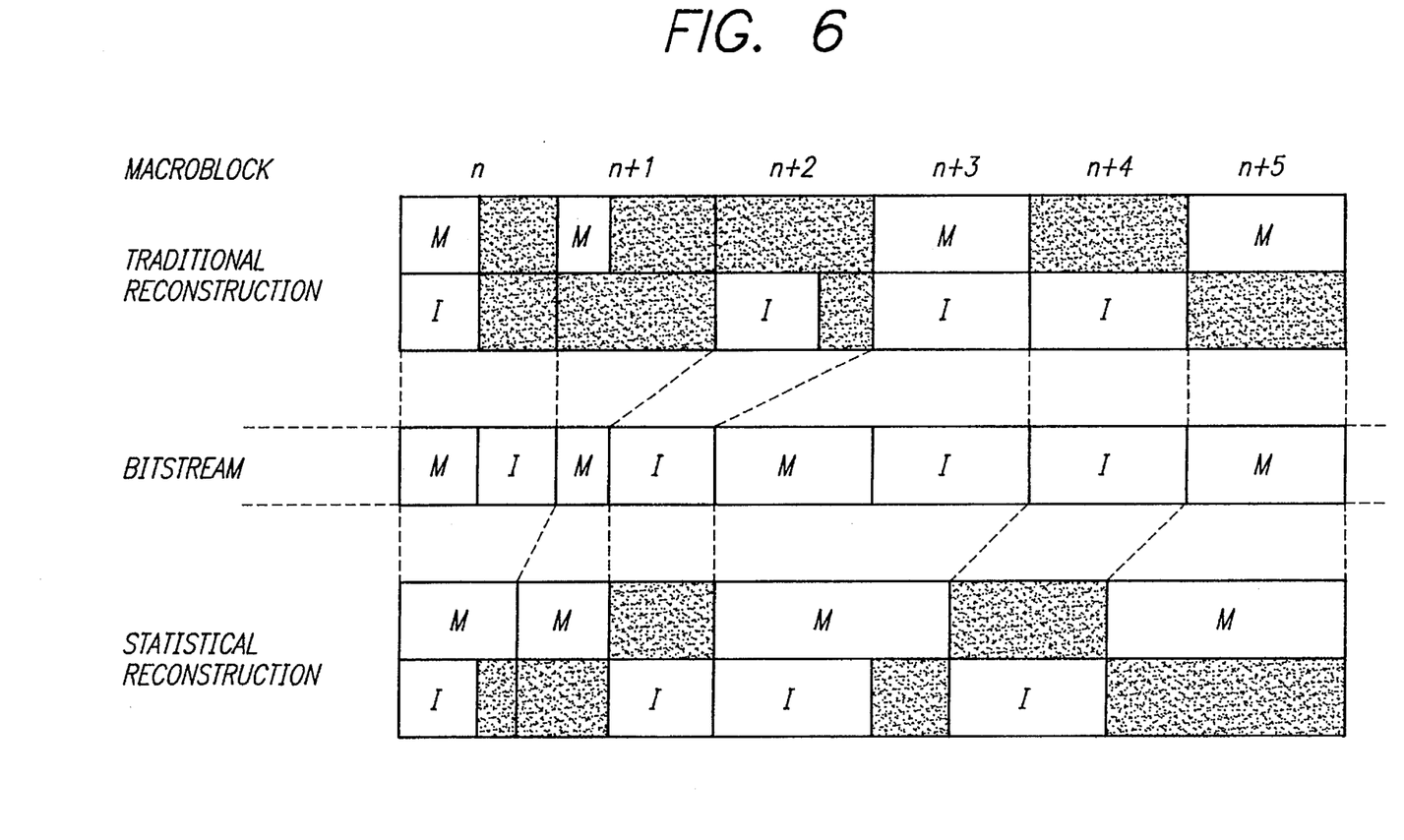
FIG. 6 is a diagram illustrating traditional MPEG macroblock decoding or reconstruction in comparison with a statistically derived decoding method of the invention.

As illustrated in FIG. 6, a simplified video bitstream includes macroblocks n to n+5 of video data as shown in the middle row of the drawing. The first macroblock n includes both motion compensation data M and DCT transform coded data I. The second macroblock n+1 includes only motion compensation data M. The third macroblock n+2 includes only DCT coded data I. The fourth macroblock n+3 includes both M and I data, the fifth macroblock includes only I data whereas the sixth macroblock n+5 includes only M data.

In the conventional or traditional decoding or reconstruction method, a fixed length of time is allocated for decoding each macroblock, with no consideration being given to the type of encoding or the actual length of time required for processing or decoding a particular macroblock. This is illustrated in the upper two rows of FIG. 6, in which the width of each macroblock n to n+5 is the same.

The fixed processing time as determined in the prior art is based on the worst case scenario, in which each macroblock is assumed to include both M and I data which are encoded using the most complex modes. However, in reality, the complex I and especially M modes are used in a low percentage of the macroblocks in a picture. It is virtually impossible to code a picture with the most complex mode in all macroblocks.

The present invention enables the memory bandwidth of the DRAM 34 (the product of the memory word length and the access time) to be reduced by controlling the motion pipeline 40 and the transform pipeline 42 to concurrently process input M data and input I data respectively such that a length of time required for processing each macroblock is variable and is determined by the largest of a length of time required for the motion pipeline 40 to process the input M data and a length of time required for the transform pipeline 42 to process said the I data of said macroblock.

As illustrated in the lower two rows of FIG. 6, the length of time required to process each macroblock is allowed to vary in the present system 30. Most macroblocks will be processed in less time than in the traditional method, although some extremely complex macroblocks may require more time. Taken statistically, however, the present method enables all macroblocks of a typical picture to be decoded or processed in substantially less time than using the traditional method. This enables the bandwidth of the DRAM 34 to be reduced to enable the system 30 to be commercially manufactured at reduced cost as will be described below.

Figure 7:
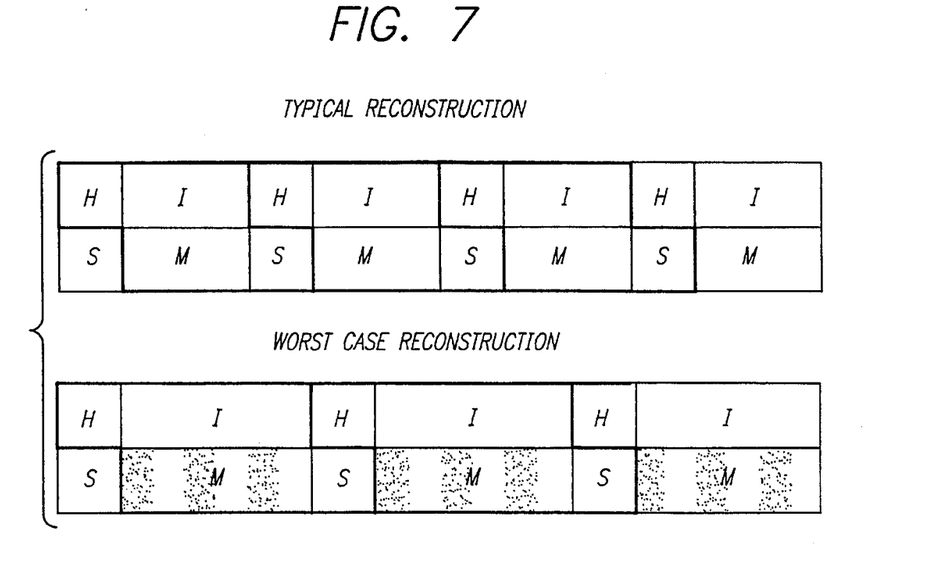
FIG. 7 is a diagram further illustrating traditional decoding in comparison with the present statistically derived decoding method.

As illustrated in FIG. 7, the present system 30 processes the M and I data concurrently in parallel using the pipelines 40 and 42 respectively. After the M and I data are processed, two other macroblock events are performed concurrently in parallel; the M and I data for a current macroblock are merged and stored by the unit 44 as indicated by S, and the header of a next macroblock is processed and stored in the DRAM 34 by the VLD 32 as indicated by H. In addition, processed M and I macroblock data is output to the display controller 46 re-ordering and presentation, and a channel refill, vld and display (CVD) operation is performed.

As illustrated in FIG. 7, typical reconstruction of macroblock data as shown in the upper two rows of the drawing is performed in a shorter length of time than with the traditional reconstruction method that is based on the worst case scenario as shown in the lower two rows. In the simplified example as shown, three macroblocks are processed using the present method in only slightly more time than is required to process two macroblocks using the traditional method.

Figure 8:
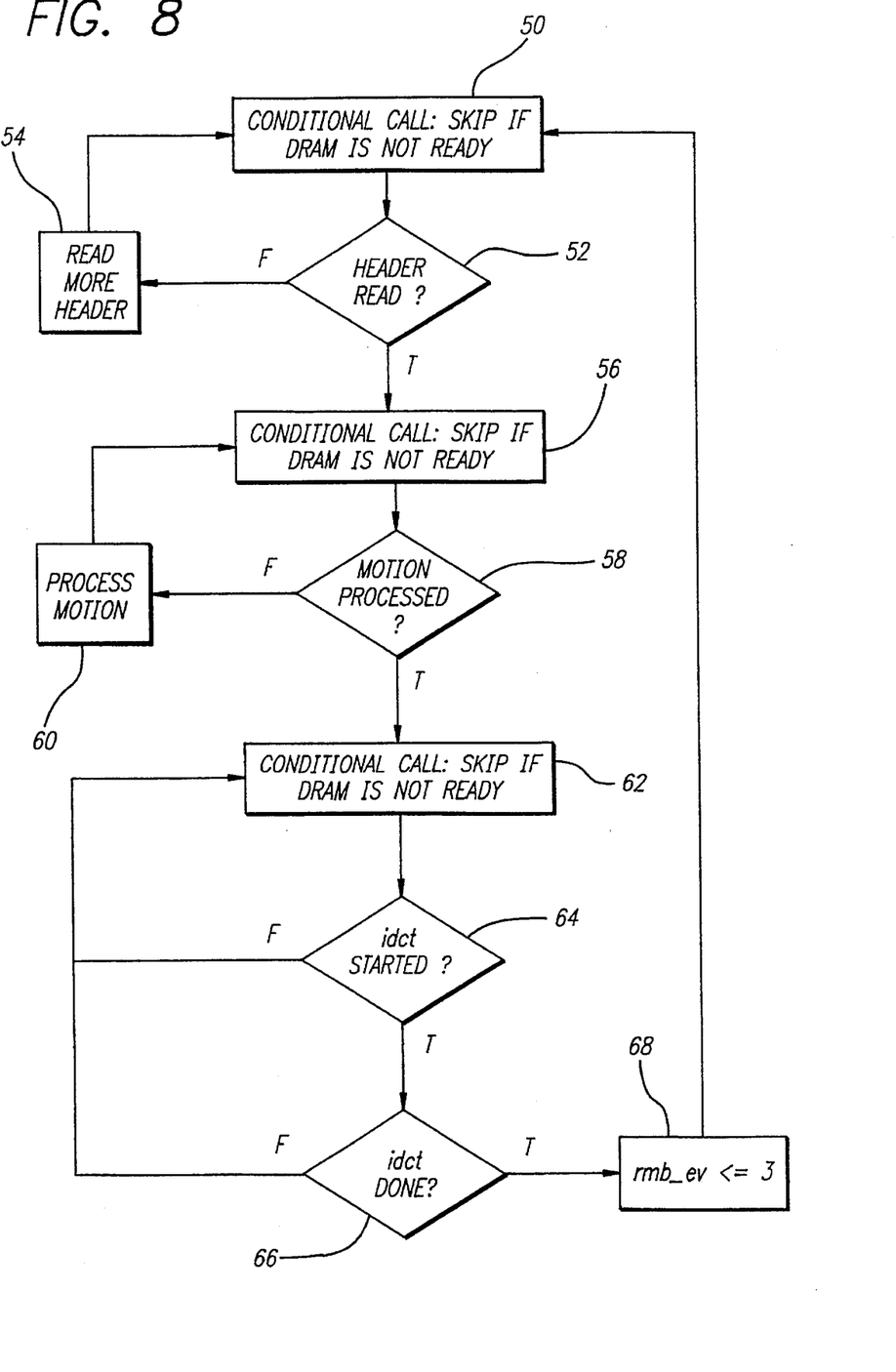
FIG. 8 is a flowchart illustrating an outer loop of a program for performing the present method.
Figure 9:
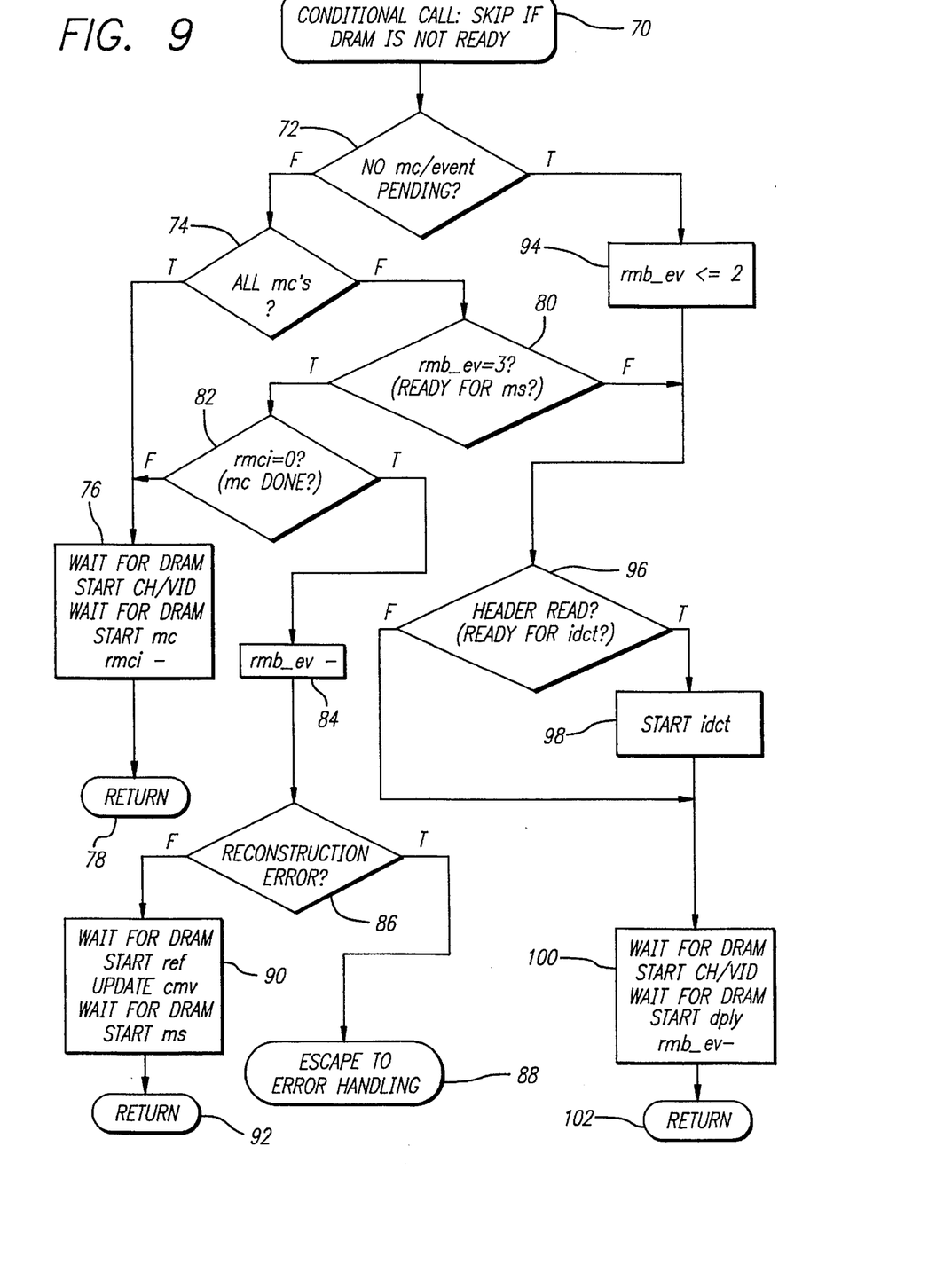
FIG. 9 is a flowchart illustrating a subroutine that is called by the outer loop of FIG. 8.

The control of the pipelines 40 and 42 in accordance with the present invention is illustrated in more detail in the flowcharts of FIGS. 8 and 9 which represent the program stored in the ROM 38. FIG. 8 illustrates an outer loop that calls an inner loop of FIG. 9 using a conditional call command. The conditional call is skipped if the DRAM 34 is not ready (in use).

The method of FIGS. 8 and 9 uses two variables that are set and decremented as will be described below. The variables are:

1. Number of macroblock events—rmb_ev

This variable indicates a number of macroblock events, consisting of merge and store S and display D.

2. Number of motion compensation events—rmci

This variable indicates the number of M segments of a current macroblock that have not been processed. The maximum value of rmci is typically 8.

Action is taken in accordance with the value of rmb_ev as in the following table.

| rmb_ev | Action |
| --- | --- |
| 3 | Start S, set rmb_ev to 2 |
| 2 | Start CVD, set rmb_ev to 1 |
| 1 | Start CVD, set rmb_ev to 0 |

The inner loop of FIG. 9 operates based on rmb_ev and rmci as in the following table.

| rmb_ev | rmci | Action |
| --- | --- | --- |
| 0 | 0 | Set up repeat CVD and check whether to execute IDCT |
| 0 | >0 | Execute motion compensation |
| 1–2 | 0 | Execute CVD and check whether to execute IDCT |
| 1–2 | >0 | Finish CVD |
| 3 | 0 | Refresh DRAM and execute merge and store |
| 3 | >0 | Finish motion compensation |

Starting at the beginning of the outer loop of FIG. 8, the program executes and returns from the conditional call to the inner loop of FIG. 9 in a step 50. It then checks in a step 52 to see if the header of the current macroblock (including the motion compensation M data) has been read. If false (F), it loops back to read more header data in a step 54. If true (T), it continues on to execute another conditional call in a step 56 to the inner loop.

The next portion of the outer loop checks to see if all of the motion compensation information has been extracted from the header and processed in a step 58. The program loops around until this has been done. In a process motion step 60, the number of M segments to be processed is determined, and the value of rmci is set to this number.

The lower portion of the outer loop calls the inner loop in a step 62, checks to see if the IDCT processing for a segment of I data has been started in a step 64, and then if the IDCT processing has been completed in a step 66. Upon completion of the IDCT processing, the variable rmb_ev is set to 3 in a step 68 and the outer loop returns to its beginning step 50.

The inner loop, as illustrated in FIG. 9, receives the conditional call from the outer loop in a step 70, and then performs a step 72 to see if any motion compensation segments or macroblock events have not been processed. If false, the program checks in a step 74 to see if the remaining events are all motion compensation. If true, the following actions are taken in a step 76 and the program returns to the outer loop of FIG. 8 in a step 78.

1. Wait for the DRAM to become available.
2. Start CVD.
3. Wait for the DRAM to become available.
4. Start motion compensation processing.
5. Decrement rmci.

If all remaining macroblock events are not motion compensation, the program checks in a step 80 to see if rmb_ev =3, which indicates that the system is ready for merge and store (S). Then, a check is made in a step 82 to see if rmci =0, indicating that all motion compensation has been performed. If false, execution proceeds to the step 76. If true, rmb_ev is decremented in a step 84 and the program then checks in a step 86 if any reconstruction or processing errors have been detected.

If a processing error has been detected, the program jumps to an error handling routine in a step 88. If not, a step 90 is performed which includes the following actions.

1. Wait for the DRAM to become available.
2. Start DRAM refresh.
3. Update the concealment motion vector (CMV).
4. Wait for the DRAM to become available.
5. Start merge and store (S).

The program then returns to the main loop at a step 92.

Returning to the description of the step 72, if no motion compensation segments or macroblock events are pending, the program proceeds to a step 94 in which rmb_ev is set to 2 to force repeat CVD refills, and then to a step 96 in which a check is made to see if the header has been read (the operation is ready for IDCT). If the result in step 80 is false, the program also branches to the step 96.

If the result of step 96 is true, IDCT processing is started in a step 98 and a step 100 is performed which includes the following actions. The step 100 is also performed if the result of step 96 is false. The step 100 includes the following actions.

1. Wait for the DRAM to become available.
2. Start CV operation.
3. Wait for the DRAM to become available.
4. Start display D operation.
5. Decrement rmb_ev.

The program then returns to the main loop in a step 102.

As a result of the operation of the inner loop of FIG. 9, the system 30 stores input M data and input I data from the bitstream in the DRAM 34. The motion pipeline 40 reads input M data from the DRAM 34 and stores processed M data in the DRAM 34. The transform pipeline 42 reads input I data from the DRAM 34 and stores processed I data in the DRAM 34.

The microcontroller 36 schedules the motion pipeline 40, the transform pipeline 42 and the DRAM 34 such that reading of I data has priority over reading of M data. More specifically, the microcontroller 36 controls the motion pipeline 40 to inhibit reading a next segment of input M data while the transform pipeline 42 is processing a segment of input I data.

Figure 10:
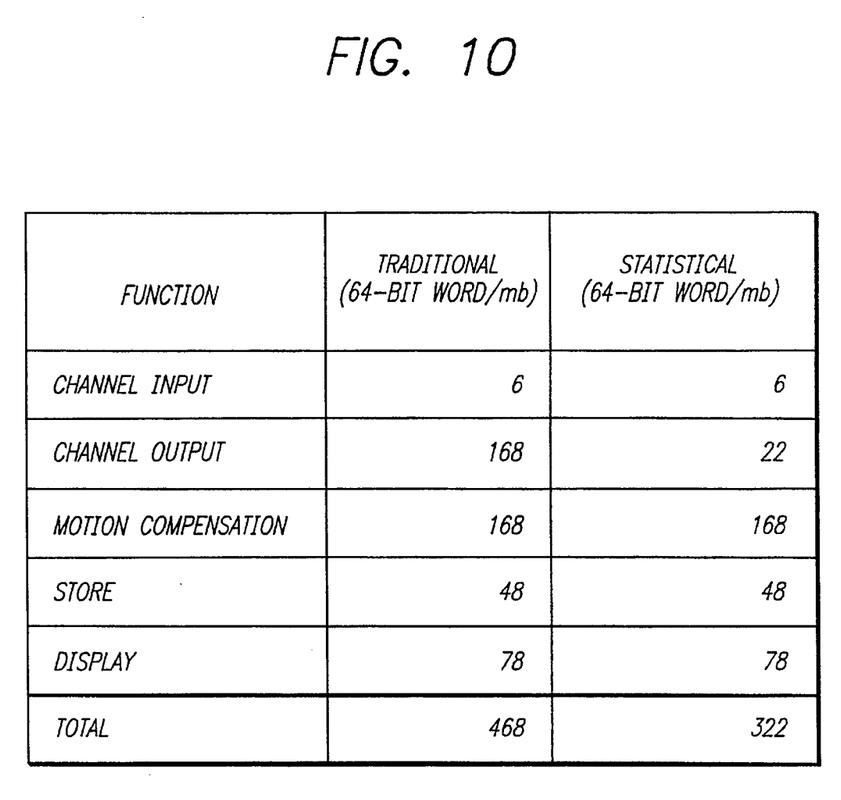
FIG. 10 is a chart illustrating how the memory bandwidth requirement of the present system is reduced in comparison with the prior art.

FIG. 10 is a table illustrating a numerical example of how the memory bandwidth of the DRAM 34 can be reduced by the present statistically derived decoding method. The numbers in the table indicate the numbers of DRAM access (read and write) operations that are required for each function using the traditional method and the present statistical method. It is assumed that the memory word length is 64 bits per macroblock, and that the picture display rate is 30 pictures/sec.

The channel input for the traditional method is calculated as follows, and is the same as for the present method:

$$\begin{aligned}\text{Channel input} = &\ (1.5 \times 10^7 \text{ bits/sec}) \\ &\div (30 \text{ frames/sec}) \\ &\div (1{,}350 \text{ macroblocks/frame}) \\ &\div (64 \text{ bits/word}) \\ = &\ 6 \text{ words/macroblock}\end{aligned}$$

The local channel output for the traditional method (worst case) is calculated as follows.

$$\begin{aligned}\text{Channel output} = &\ (384 \text{ coefficients/macroblock}) \\ &\times (28 \text{ bits/coefficient}) \\ &\div (64 \text{ bits/word}) \\ = &\ 168 \text{ words/macroblock}\end{aligned}$$

The global channel output for the present method (statistical decoding) is calculated as follows.

$$\begin{aligned}\text{Channel output} = &\ (1{,}835{,}008 \text{ bits/frame}) \\ &\div (1{,}350 \text{ macroblocks/frame}) \\ &\div (64 \text{ bits/word}) \\ = &\ 22 \text{ words/macroblock}\end{aligned}$$

The motion compensation operation, which is the same for the traditional and present methods, is calculated as follows.

```
Motion compensation = (9 luma lines/field)
                    + (5 chroma lines/field)
                    × (3 words/line)
                    × (4 fields)
                    = 168 words/macroblock
```

The merge and store operation, which is the same for the traditional and present methods, is calculated as follows.

```
Store = (16 luma lines)
      + (8 chroma lines)
      × (2 words/line)
      = 48 words/macroblock
```

The display operation, which is the same for the traditional and present methods, is calculated as follows.

$$\begin{aligned}\text{Display} &= (2.29 \times 10^{-5} \text{ seconds/macroblock})\\&\quad \times (2.7 \times 10^7 \text{ bytes/sec})\\&\quad \div (8 \text{ bytes/word})\\&= 78 \text{ words/macroblock}\end{aligned}$$

To illustrate how the present statistically derived decoding method can reduce the required bandwidth based on the above calculations, the access speed of the DRAM 34, expressed as megawords/per second for the traditional decoding method, is given as:

$$\begin{aligned}\text{Access speed} &= (1,350 \text{ macroblocks/picture})\\&\quad \times (30 \text{ pictures/sec})\\&\quad \times (468 \text{ words/macroblock})\\&= 18.95 \text{ megawords/sec}\end{aligned}$$

The present statistically derived decoding method enables the access speed to be reduced to $322/468=0.688$ that of the traditional case, or 13.04 megawords/sec. This enables the present system 30 to be embodied using a substantially slower and less expensive DRAM 34. Alternatively, if the access speed is the same, the word length of the DRAM 34 could be reduced from 64 bits to 48 bits.

In summary, the statistically derived decoding method according to the present invention takes into account the behavior of the various macroblock coding types. It determines the bandwidth requirement at a higher picture level instead of at the macroblock level. Then, the bandwidth allocation is done in a demand driven fashion, such that a macroblock with less bandwidth requirement will be decoded faster than a complex macroblock with higher bandwidth requirement.

Furthermore, the reconstruction time for the small percentage of complex macroblocks is allowed to extend longer than average cases. This higher level bandwidth optimization results in significantly better bandwidth utilization and lower instantaneous peak bandwidth.

The present statistical decoding technique thereby provides a significant improvement in bandwidth utilization which translates into savings in system cost in terms of lower memory cost and reduced power consumption. It enables real-time high quality full-motion video processing in low cost applications such as consumer electronics.

Various modifications will become possible for those skilled in the art after receiving the teachings of the present disclosure without departing from the scope thereof.

I claim:

1. A decoding system for decoding a video data bitstream including macroblocks of data which can each include input Motion Compensation (M) data and input Transform Coded (I) data, comprising:

a motion pipeline for processing said input M data to produce processed M data;

a transform pipeline for processing said input I data to produce processed I data; and a controller for controlling the motion pipeline and the transform pipeline to concurrently process said input M data and said input I data respectively such that a length of time required for processing each macroblock is variable and is determined by the largest of a length of time required for the motion pipeline to process said input M data and a length of time required for the transform pipeline to process said input I data of said macroblock.

2. A system as in claim 1, in which:

each macroblock further comprises a header;

the system further comprises a data memory for storing said processed M and I data; and the controller further causes said processed M data of each macroblock to be merged and stored in the data memory with said processed I data of said macroblock concurrently with reading a header of a next macroblock.

3. A system as in claim 2, in which:

the controller further stores said input M data and said input I data from said bitstream in the data memory;

the motion pipeline reads said input M data from the data memory and stores said processed M data in the data memory;

the transform pipeline reads said input I data from the data memory and stores said processed I data in the data memory; and the controller further schedules the motion pipeline, the transform pipeline and the data memory such that reading and writing of I data has priority over reading and writing of M data.

4. A system as in claim 2, in which:

the controller further stores said input M data and said input I data from said bitstream in the data memory;

the motion pipeline reads segments of said input M data from the data memory and stores segments of said processed M data in the data memory;

the transform pipeline reads segments of said input I data from the data memory and stores segments of said processed I data in the data memory; and the controller further controls the motion pipeline to inhibit reading a next segment of said input M data while the transform pipeline is processing a segment of said input I data.

5. A system as in claim 2, in which said input M data is included in said header of each macroblock respectively.

6. A system as in claim 2, in which:

said bitstream is encoded in accordance with an MPEG specification; and said input I data is coded using a Discrete Cosine Transform (DCT).

7. A system as in claim 2, in which:

the motion pipeline, transform pipeline and controller are formed on a single integrated circuit chip; and the data memory is separate from and operatively connected to said chip.

8. A system as in claim 7, in which the controller comprises:

a microcontroller formed on said chip; and a program memory that is formed on the chip and stores a program for execution by the microcontroller.

9. A system as in claim 2, further comprising:

a communications channel for receiving said bitstream;

in which the controller further extracts said input M data and said input I data from said bitstream in the channel and stores said input M data and said input I data in the data memory.

10. A system as in claim 9, in which:

said bitstream is further variable length encoded; and the system further comprises a variable length decoder for variable length decoding said bitstream before the controller stores said input M data and said input I data in the data memory.

11. A method of decoding a video data bitstream including macroblocks of data which can each include input Motion Compensation (M) data and input Transform Coded (I) data, comprising the steps of:

(a) processing said input M data to produce processed M data;

(b) processing said input I data to produce processed I data; and (c) concurrently controlling processing of said input M data and said input I data in steps (a) and (b) respectively such that a length of time required for processing each macroblock is variable and is determined by the largest of a length of time required for processing said input M data in step (a) and a length of time required for processing said input I data in step (b) of said macroblock.

12. A method as in claim 11, in which:

each macroblock further comprises a header; and the method further comprises the step of:

(d) causing processed M data of each macroblock to be merged and stored in a data memory with processed I data from said macroblock concurrently with reading a header of a next macroblock.

13. A method as in claim 12, further comprising the step of:

(e) storing said input M data and said input I data from said bitstream in the data memory; in which step (a) comprises reading said input M data from the data memory and storing said processed M data in the data memory;

step (b) comprises reading said input I data from the data memory and storing said processed I data in the data memory; and step (c) comprises scheduling the motion pipeline, the transform pipeline and the data memory such that reading and writing of I data has priority over reading and writing of M data.

14. A method as in claim 12, in which further comprising the step of:

(e) storing said input M data and said input I data from said bitstream in the data memory; in which step (a) comprises reading segments of said input M data from the data memory and storing segments of said processed M data in the data memory;

step (b) comprises reading segments of said input I data from the data memory and storing segments of said processed I data in the data memory; and step (c) comprises inhibiting reading a next segment of said input M data while processing a segment of said input I data.

15. A method as in claim 12, in which said input M data is included in said header of each respective macroblock.

16. A method as in claim 12, in which:

said bitstream is encoded in accordance with an MPEG specification; and said input I data is coded using a Discrete Cosine Transform (DCT).

17. A method as in claim 12, further comprising the steps of:

(e) extracting said input M data and said input I data from bitstream; and (f) storing said input M data and said input I data in the data memory.

18. A method as in claim 17, in which:

said bitstream is further variable length encoded; and the method further comprises the step of:

(g) variable length decoding said bitstream before storing said input M data and said input I data in the data memory.

* * * * *